H. H. STEELE.
TYPE WRITING MACHINE.
APPLICATION FILED MAY 9, 1911.
1,053,448.
Patented Feb. 18, 1913.
7 SHEETS—SHEET 4.
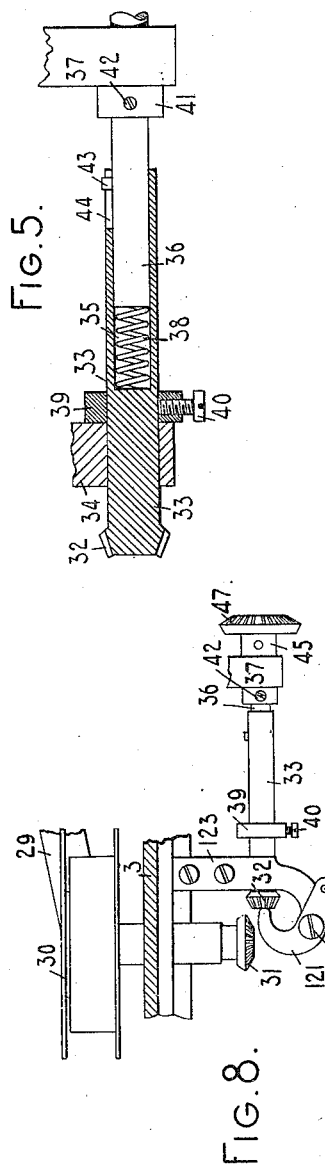
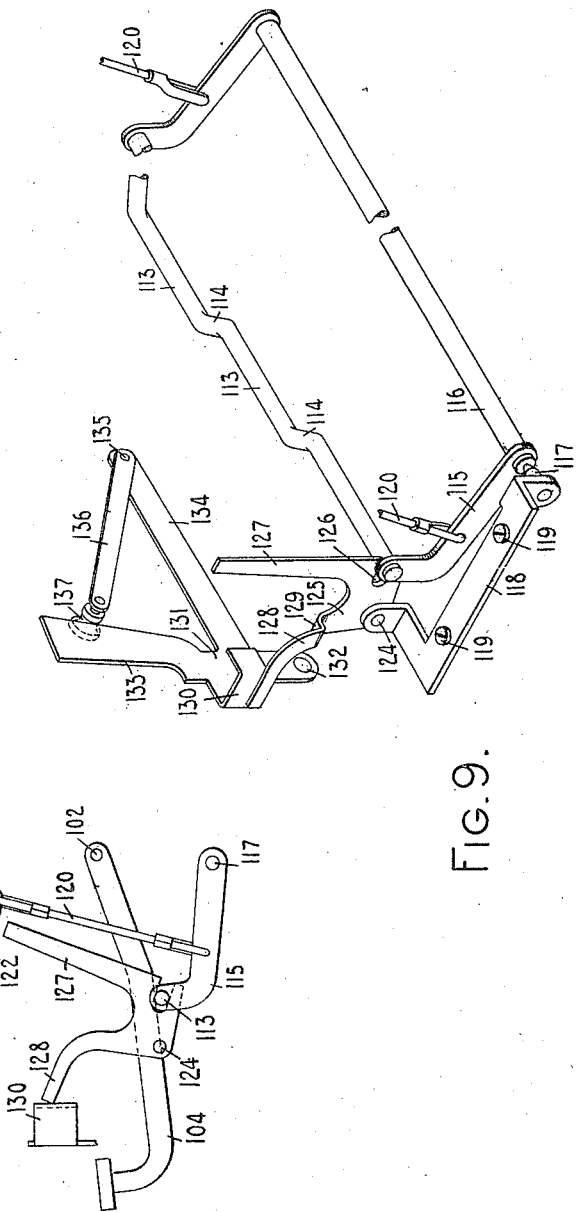
WITNESSES:
INVENTOR
Herbert H. Steele
By Jacob Felbel
HIS ATTORNEY

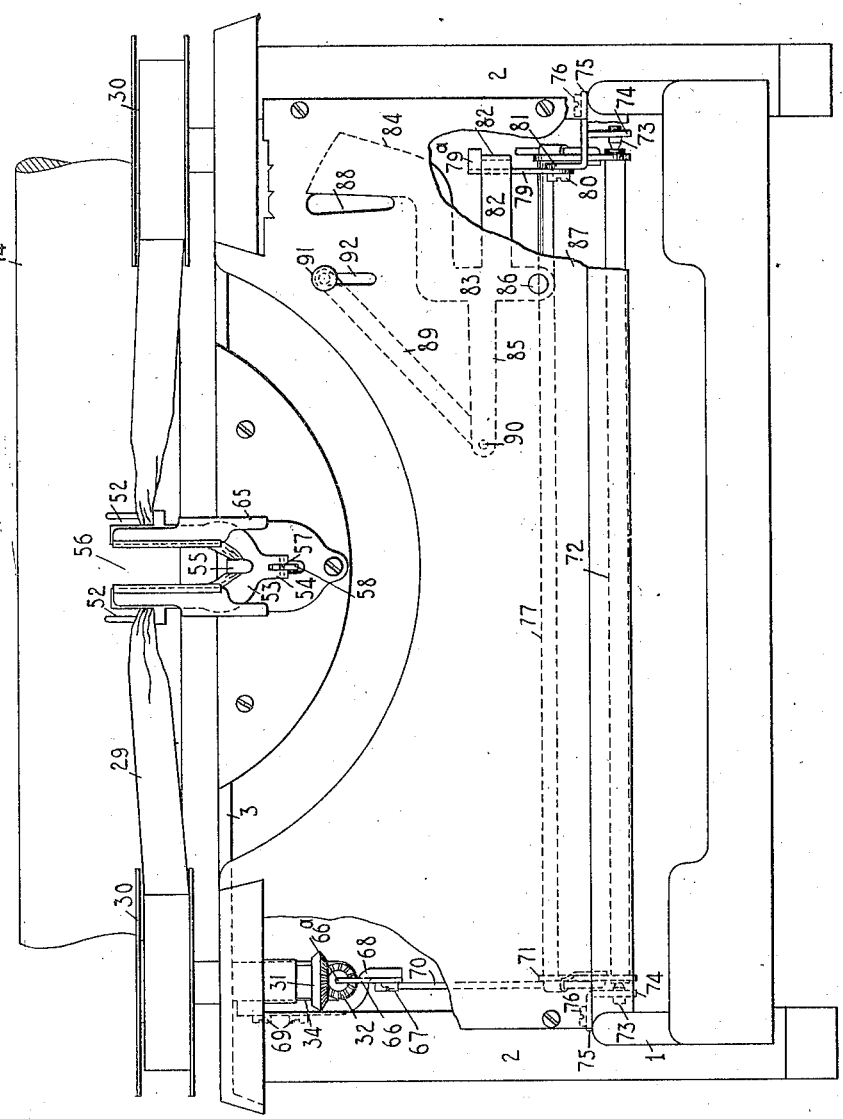

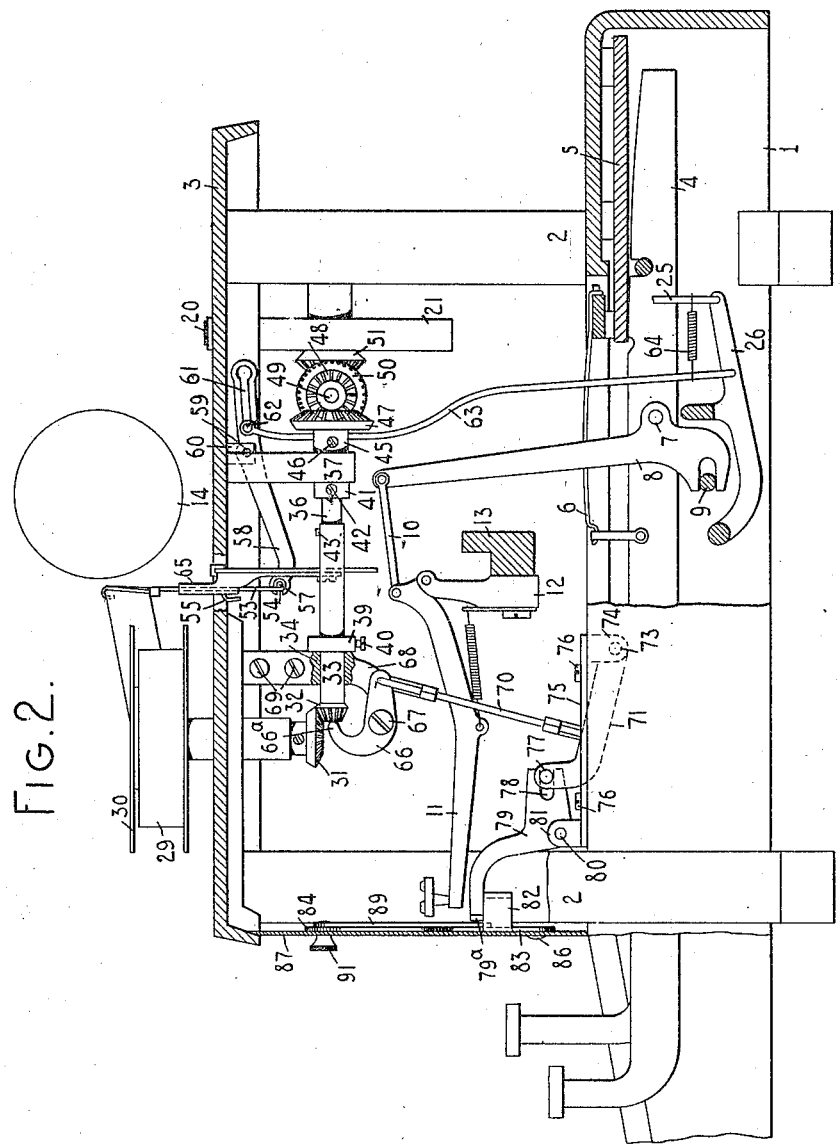

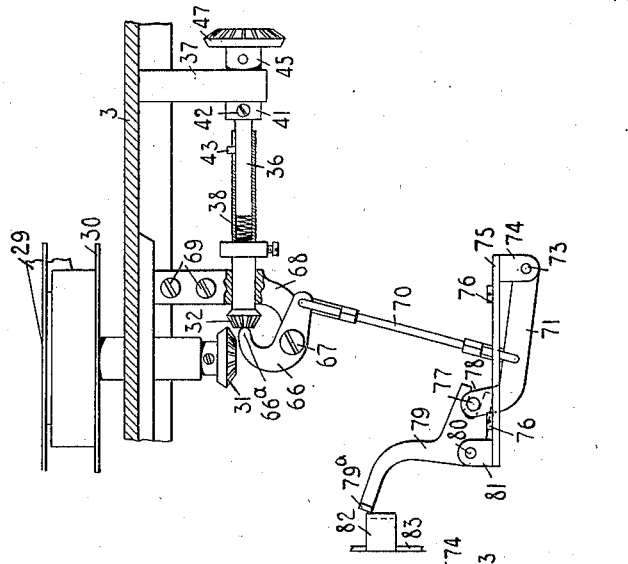

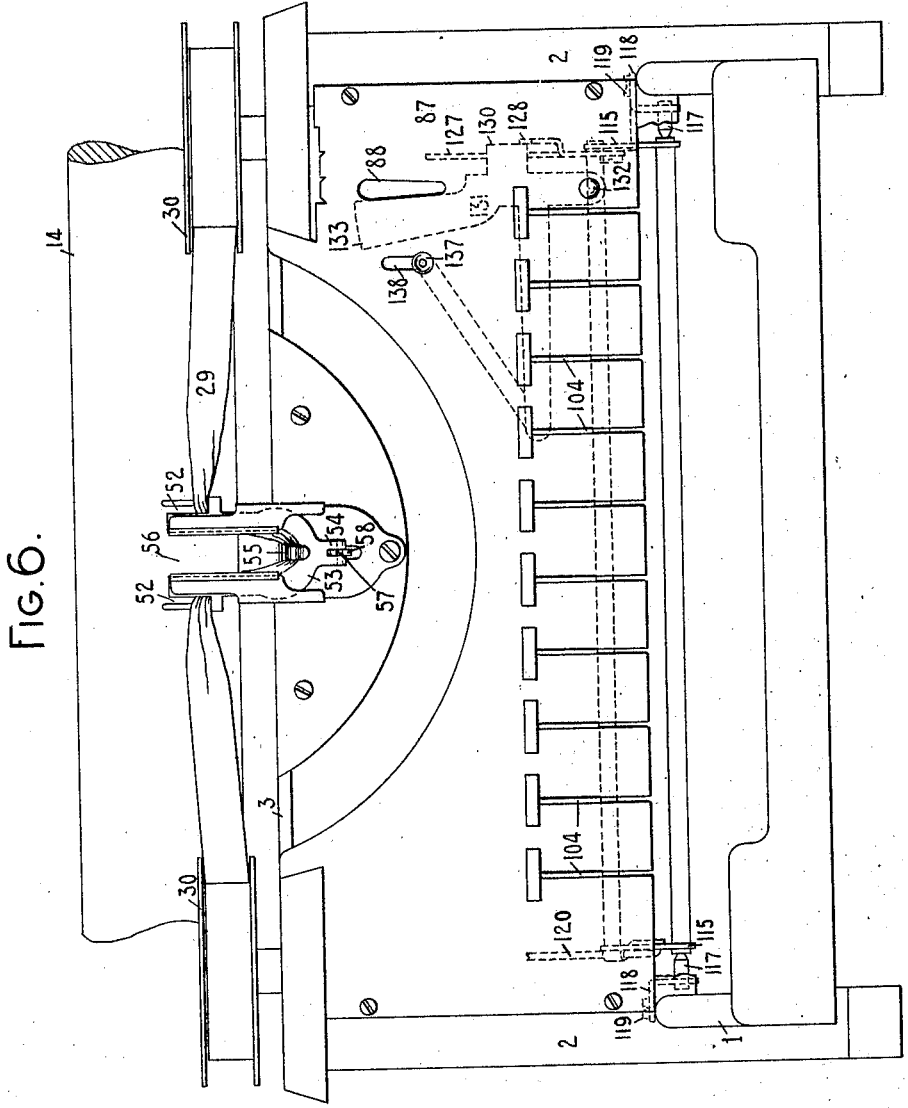

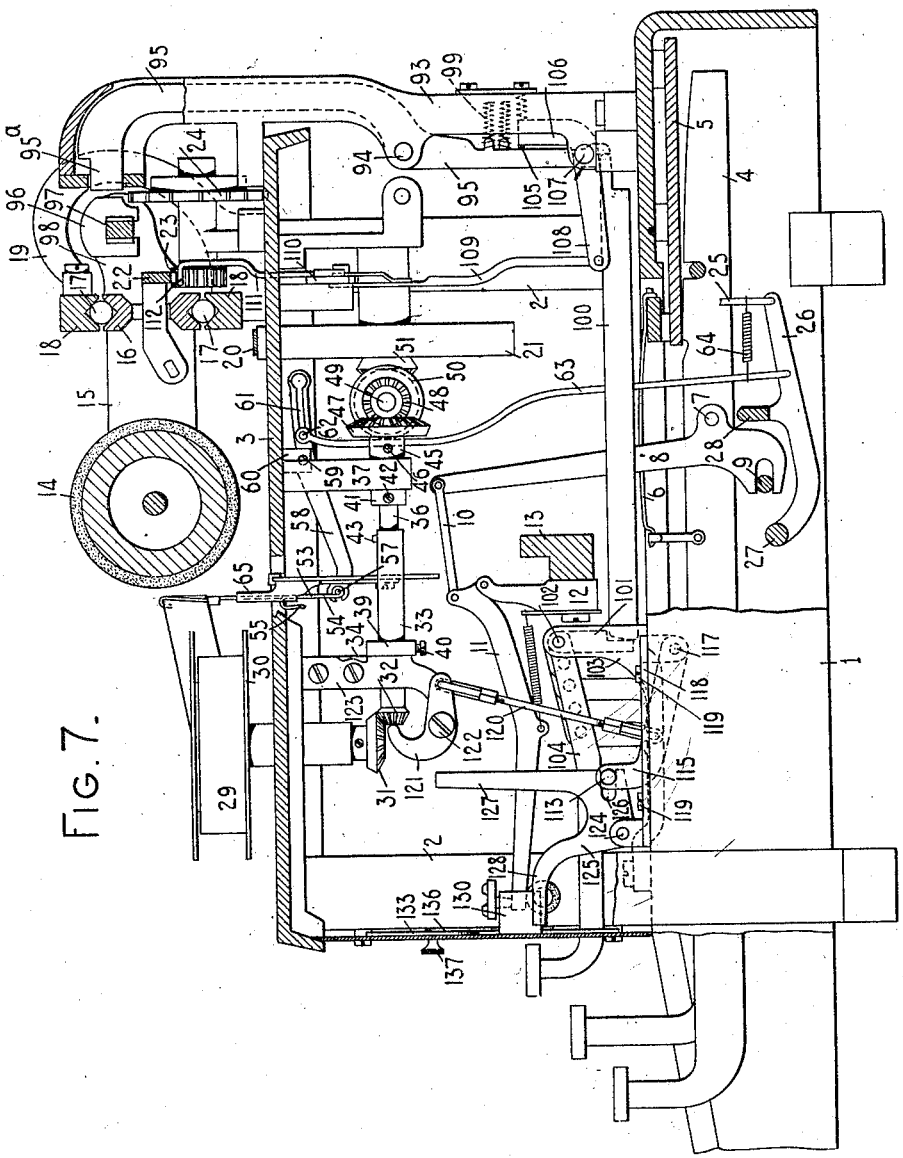

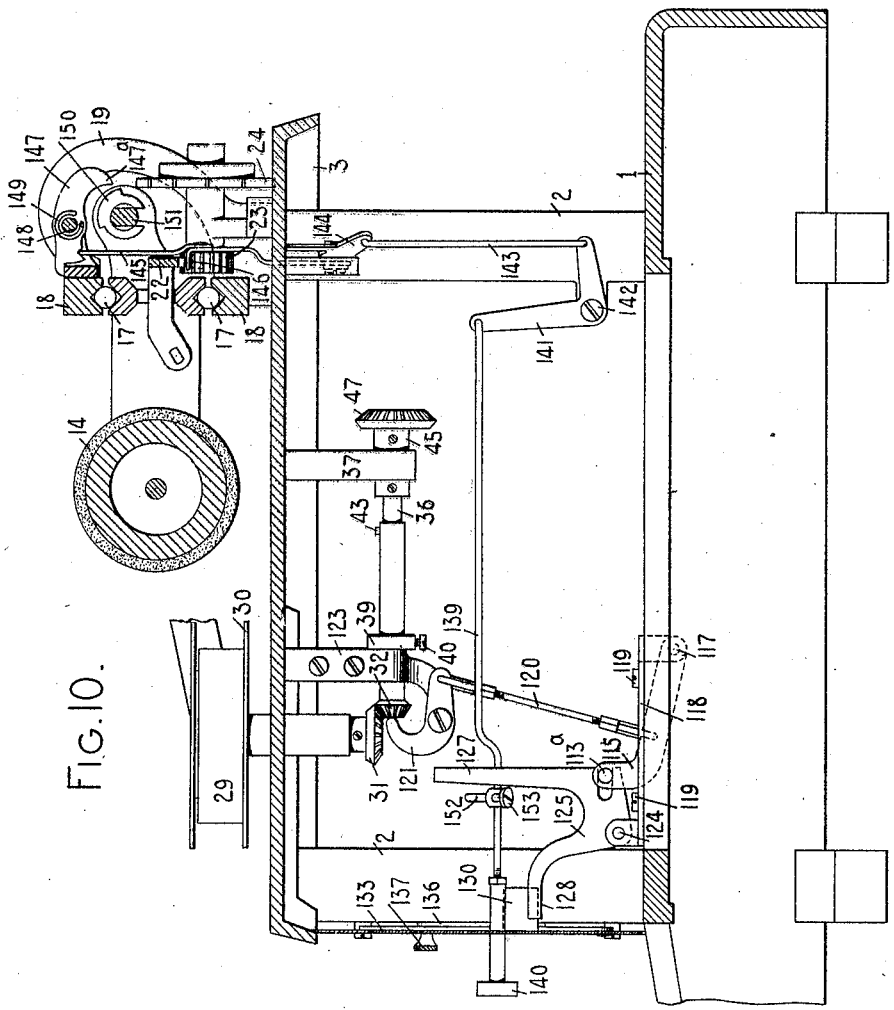

UNITED STATES PATENT OFFICE.

HERBERT H. STEELE, OF MARCELLUS, NEW YORK, ASSIGNOR TO THE MONARCH TYPEWRITER COMPANY, OF SYRACUSE, NEW YORK, A CORPORATION OF NEW YORK.

TYPE-WRITING MACHINE.

1,053,448.   Specification of Letters Patent.   Patented Feb. 18, 1913.

Application filed May 9, 1911.   Serial No. 625,958.

*To all whom it may concern:*

Be it known that I, HERBERT H. STEELE, citizen of the United States, and resident of Marcellus, in the county of Onondaga and State of New York, have invented certain new and useful Improvements in Typewriting Machines, of which the following is a specification.

My invention relates to ribbon mechanism for typewriting machines and its general object is to provide improved mechanism of the character specified.

More specifically, the chief object of my invention is to provide improved means for rendering inoperative or cutting out the mechanism for feeding the ribbon longitudinally, said improved means being operative at will and being especially adapted for use when the machine is to be employed for preparing stencil or mimeograph sheets.

Another object of the invention is to provide an improved vibratory ribbon carrier on which the printing portion of the ribbon may be arranged or located either in a position to coöperate with the types at printing operation or in a position in which the types will not strike it when actuated.

To the above and other ends my invention consists in the features of construction, combinations of devices and arrangements of parts hereinafter described and particularly pointed out in the claims.

In the accompanying drawings, wherein I have shown several forms of my invention, Figure 1 is a front elevation of a Monarch typewriting machine embodying a preferred form of my invention, parts of the machine being omitted and parts broken away. Fig. 2 is a fragmentary side elevation of said machine, parts being shown in section and parts being broken away. Fig. 3 is a fragmentary sectional view corresponding to Fig. 2 but omitting some parts and showing other parts in different relationships. Fig. 4 is a fragmentary perspective view of parts of the ribbon cut-out mechanism. Fig. 5 is a vertical longitudinal sectional view of part of the train of devices for turning one of the ribbon spools. Fig. 6 is a view corresponding to Fig. 1 but showing a modification of my invention applied also to a Monarch typewriting machine. Fig. 7 is a fragmentary side elevation of the machine shown in Fig. 6, parts being shown in section and parts being broken away. Fig. 8 is a fragmentary side elevation corresponding to Fig. 6 but showing the ribbon feeding mechanism disconnected. Fig. 9 is a fragmentary perspective view of the modified construction of ribbon cut-out shown in Figs. 6 to 8. Fig. 10 is a fragmentary side elevation, partly in vertical section, of a third modification also applied to a Monarch machine.

Referring to the Monarch machine illustrated in the various views and to which type of machine the three forms of my invention herein illustrated are adapted, the main frame of said machine comprises a base 1, corner posts 2 and a top plate 3. Key levers 4 are fulcrumed on a plate 5 mounted in the rear portion of the base. Each key lever is provided with a restoring spring 6 and pivotally supports at 7 a sub-lever 8. The lower arm of each sub-lever is slotted to coöperate with a fixed abutment 9 and the upper arm is connected by a link 10 with a type bar 11 pivoted on a hanger 12 secured to a shiftable support or segment 13. The type bars are adapted to coöperate with the front face of a platen 14 which, as shown in Fig. 7, is supported on the side arms or bars 15 of a platen carrier or carriage which further comprises a rear or slide bar 16 coöperating through anti-friction balls 17 with grooved rails or track ways 18 secured to stationary curved brackets 19 rising from the top plate 3. The carriage is connected by a band or strap 20 with a source of power in the form of a spring drum 21 which constantly urges said carriage leftward. The letter space movements of the carriage are controlled by devices comprising a rack 22 pivotally mounted on the carriage and normally meshing with a pinion 23 which is operatively connected with a toothed escapement wheel 24. Said escapement wheel coöperates with escapement dogs (not shown), said dogs being connected by devices comprising a link 25 with a central arm 26 of a universal bar frame which further comprises both a rock shaft 27 pivoted in the sides of the base and also a universal bar 28, said universal bar underlying the key levers and being operative thereby.

A ribbon 29 is wound upon ribbon spools 30 horizontally disposed above the top plate and forward of the platen, one at each side of the machine. Each ribbon spool 30 is operatively connected with a beveled pinion 31 which normally meshes with a smaller beveled pinion 32, said pinion 32, as appears clearly from Fig. 5, being at the forward end of a shaft 33 slidably supported in a lug 34 depending from the top plate 3. The rear end portion of the shaft 33 is formed with a seat or depression 35 which receives the forward end portion of a shaft 36, said shaft 36 bearing in a lug 37 depending from the top plate. A coiled expansion spring 38 is arranged in the depression 35 between the bottom thereof and the end of the shaft 36. Said spring tends constantly to press apart the two shafts 33 and 36 which together constitute a two-part shaft, one part supporting the other and the two parts being relatively movable.

The normal relationship between the shafts or shaft parts is determined by collars, one collar 39 being secured by a set screw 40 to the shaft 33 and the second collar 41 being secured by a set screw 42 to the shaft 36, the collar 39 coöperating with the rear face of the lug 34 and the collar 41 with the front face of the lug 37. A radial pin 43 projecting from the shaft 36 engages a slot 44 in the shaft 33, the pin and slot connection causing the two shafts 33 and 36 to turn together while permitting relative endwise motion to take place between them. The construction is such that by pressing the forward end of the shaft 33 the spring 38 will be caused to yield, permitting rearward movement of the shaft 33 to take place so as to disconnect it from the pinion 31. This is a novel mounting of the pinion 32 for, as heretofore constructed, the pinion has been held permanently in mesh with the pinion 31. A collar 45, secured by a set screw 46 to the shaft 36, coöperates with the lug 37 to prevent forward endwise movement of the shaft 36. The shaft 36, it will be seen, while free to turn in its bearing, is held from both forward and backward endwise movement. Integral with the collar 45 is a beveled pinion 47 which is adapted to mesh with a beveled actuating pinion 48 secured to a power or driving shaft 49. Said shaft is connected by devices comprising intermeshing beveled pinions 50 and 51 with the source of power or spring drum 21 in such a way that when said spring drum turns to feed the carriage in printing direction, the power shaft 49 is correspondingly turned or rotated, while furthermore said power shaft may be moved endwise in a known manner either automatically or by hand so as to cause one or another of the two actuating pinions 48 to coöperate with its associate pinion 47 so as to turn or drive the ribbon spools in alternation and feed the ribbon longitudinally back and forth. It will be understood that the endwise movements of the power shaft do not disturb the connection between the power shaft and the spring drum, the pinions 50 and 51 remaining constantly engaged.

Midway between the ribbon spools the ribbon is threaded through guiding slots 52 in an upright ribbon carrier or vibrator which comprises a body portion 53 preferably formed of sheet metal and having a depending stem 54. The vibrator is or may be of the usual construction but is further provided, near its lower end, with a downwardly extending central hook or engaging or detaining device 55. When the ribbon is in use its printing portion extends horizontally across and behind the vibrator from one slot 52 to the other; but when the machine is to be used for stencil work or the like, the printing portion may be pulled down by the tip of a pencil or other convenient means and hooked under the hook or detaining device 55 as shown in Figs. 1 and 6. By this means the ribbon is held or retained out of the path of the printing types and the types will strike through the printing opening 56 of the vibrator without contacting with the ribbon.

The stem 54 of the vibrator has a slot bridged by a cross pin 57 which is engaged by the slotted forward end of an operating lever 58 fulcrumed at 59 on a lug 60 depending from the top plate. The rear arm of the operating lever has a slot 61 which is engaged by an actuating stud 62 projecting laterally from the top of a link 63 which is pivotally connected at its lower end to the central arm 26 of the universal bar frame. A spring 64 connects the links 63 and 25 and tends constantly to swing the link 63 rearward. The position of the link, and the consequent relationship of the actuating stud 62 with respect to the operating lever, is controlled by a settable controller (not herein shown) but which is or may be of the construction found in the Monarch typewriting machine and disclosed in the patent to Seib, No. 863,947, dated August 20, 1907.

It will be understood that the vibratory movements of the operating lever and the vibrator may be varied accordingly as the stud 62 is moved farther from or nearer to the fulcrum 59. The up and down movements of the vibrator are guided by an upright guide 65 which is secured to the top plate of the machine.

When, as in stencil work, the ribbon is not being used for printing purposes, it is desirable to cut out or render inoperative the mechanism for feeding the ribbon longitudinally, in order that none of the ribbon surface shall be fed past the printing point without being used. The devices which I prefer to employ for accomplishing this cut-out of the ribbon, are illustrated in Figs. 1 to 5, and, generally described, comprise key controlled ribbon cut-out levers 66 which operate against the pinions 32 to push them rearward and disconnect them from the coöperating pinions 31. It will be understood that there are two of these levers, one for each pinion 32, the right-hand one being shown in Fig. 2 and the left-hand one in Fig. 1. Each lever 66 is fulcrumed at 67 at the lower end of a bracket 68 secured by screw 69 to the outer face of the neighboring lug 3. The forward arm of the lever 66 curves upward and rearward terminating in a nose 66ª which normally is opposite and contiguous to the central portion of the front face of the pinion 32. The rear arm of the lever 66 is connected by a link 70 with an arm 71 which is secured to a rock shaft 72, said rock shaft bearing at its ends on pivot pins 73 secured to ears 74 depending from the rear of brackets 75 secured by screws 76 to the top portions of the sides of the base 1. As will be understood from Fig. 4 there are two arms 71, one secured near each end of the rock shaft 72, the left-hand arm being also connected by a link 70 with the left-hand lever 66. The forward end portions of the arms 71 are connected by a cross rod 77, the cross rod 77, the arms 71 and the rock shaft 72 constituting a swinging or rocking frame. The right-hand end portion of the cross rod 77 engages a slot 78 formed in the rear arm of a lever 79 fulcrumed at 80 on an upturned extension or ear 81 at the forward end of the right-hand bracket 75. The forward arm of the lever 79 is curved upward and forward and terminates in a lateral extension or off-set 79ª which together with the forward portion of the lever arm contiguous thereto coöperates with the upper edge of a U-shaped extension 82 projecting laterally from a vertical arm 83. Said arm 83 terminates at its top in an angularly disposed shutter-like portion 84, and has also a lateral extension 85 from its opposite side. The member comprising the parts 82, 83, 84 and 85 may be termed an indicator. Said member is pivoted at 86 to the front plate 87 of the machine and the shutter 84 coöperates with an opening or peep-hole 88 in the plate 87. This opening 88 is the usual opening with which the ribbon indicator plate (not shown) is adapted to coöperate. The indicator member 82—85 is arranged between the front plate 87 and said ribbon indicator plate. Motion is communicated to the member 82—85 by an arm 89 pivoted at 90 to the part 85 and extending angularly therefrom, terminating in a finger button or key 91 which projects forward through a vertical slot 92 in the front plate 87.

The normal relationship of the parts is shown in Fig. 1 from which it will be observed that the shutter 84 is at the right of the opening 88, the key 91 is at the top of the slot 92 and the U-shaped portion 82 is in coöperation with the lateral extension 79ª and the lever arm 79, which last arrangement is best understood from Fig. 4. Assuming that stencil work is to be done the printing portion of the ribbon is hooked under the hook 55 as shown in Fig. 1 and then, in order to cut out the ribbon feed, the key 91 is depressed to the bottom of the slot 92, operating to swing the member 82—85 leftward on the pivot 86. This operation causes the shutter 84 to register with the opening 88 and, if preferred, said shutter may be provided with a suitable mark or distinguishing color to indicate visually that the parts are set for stenciling work. The leftward swinging movement of the member 82—85 causes the extension 82 to act as a cam on the lever 79 and its extension 79ª, thereby swinging the lever 79 on its pivot 80 and causing the rearward arm of said lever to exert a downward pressure on the rock shaft 77, swinging the arms 71 downward and causing the links 70 to swing the levers 66 so that the noses 66ª, acting against the pinions 32, force said pinions rearward against the springs 38, thus breaking the trains of devices between the ribbon spools and the ribbon driving shaft and source of power. The result is that whichever ribbon spool is at the time connected with the power shaft it will be disconnected therefrom so that it will not turn to wind or feed the ribbon during leftward carriage movements. The position of the parts at this time is illustrated in Fig. 3. It will be understood that during the leftward swing of the member 82—85 the extension 82 will rise, lifting the off-set 79ª and its lever arm and forcing them rearward, until at the end of the rightward swing of said member the off-set 79ª will drop down behind the rear end portion of the extension 82 which will lock the lever 79 in abnormal position and will maintain the connected parts including the arms 71, links 70 and levers 66 locked in abnormal position, thus holding the pinions 32 separated or disconnected from the pinions 31. The pressure of the springs 38 will be transmitted to the off-set 79ª and said off-set will engage the extension 82 with sufficient friction to maintain the abnormal relationship between the two parts.

With the printing portion of the ribbon controlled by the hook 55, as in Fig. 1, and the pairs of pinions 32 disconnected from the coöperative pinions 31 (Fig. 3), the operation of the printing keys will cause the types to co-act directly with the platen or the paper thereon, (since the ribbon will not be vibrated high enough to intersect the path of the types) and furthermore the ribbon will not be fed longitudinally. After the stenciling or other operation the printing portion of the ribbon may be restored to normal position by disengaging it from the hook 55 and turning the spools by hand to take up the slack; then the key or finger piece 91 may be lifted to the top of the slot 92 swinging the shutter 84 out of the field of the opening 88 and freeing the off-set 79ª so that the springs 38 may operate to restore the pinions 32 and their controlling devices, comprising the levers 66, links 70, arms 71 and lever 79, to normal position.

The modification of my invention illustrated in Figs. 6 to 9 inclusive, shows the ribbon cut-out devices arranged and constructed to be operated by denominational tabulating mechanism. The denominational tabulating mechanism illustrated in these figures is that common to the Monarch typewriting machine and comprises an upright supporting frame or bracket 93 rigidly secured to the rear of the main frame and pivotally supporting at 94 a set of upright denominational stop levers 95 arranged side by side a letter space distance apart and adapted to coöperate at their upper forward end portions 95ª with column stops 96 adjustably mounted on a stop bar 97 secured to brackets or supports 98 on the carriage 15, 16. Each denominational stop lever is maintained in normal inoperative position (Fig. 7) by a coiled spring 99 and is adapted to be actuated by devices comprising a slide bar or push rod 100 which coöperates with the lower end of the associate stop lever 95 and extends horizontally forward. Coöperating with the forward end of each slide bar is a vertical crank arm 101 fixed to a rock shaft 102 supported on a bracket 103 rigidly mounted on the base 1. The rock shafts 102 are progressively arranged fore and aft of the machine at varying heights. Secured to each rock shaft 102 is a denominational key lever 104. There are ten denominational key levers shown and each one of them operates to turn one of the rock shafts 102 and actuate the associate crank arm 101, thereby sliding the bar 100 rearward and causing it to operate the associate stop lever 95. Means are provided for releasing the carriage by the same operation, said means comprising a universal bar 105 arranged behind and transversely of the lower arms of the levers 95 and operative thereby, said universal bar having depending side arms 106 pivoted on a rock shaft 107 supported on the bracket 93. A crank arm 108 extends horizontally forward from the rock shaft 107 and is connected by an upright link 109 with one arm of a lever 110, the other arm of said lever supporting an upright rack lifter 111, terminating shoes 112 which underlie the feed rack 22 and are adapted to lift the same to disconnect the carriage from the pinion 23 and escapement wheel 24 when one of the key levers 104 is operated. This denominational tabulating mechanism is more fully described in the patent to Jacob Felbel, No. 904,689, granted November 24, 1908.

Underlying the denominational key levers 104 is a universal bar 113, said universal bar being divided by bends 114 into sections differently located to compensate for the varying positions of the rock shafts or fulcrums 102 of said levers 104. The universal bar 113 is secured at its ends to crank arms 115 fixed to a rock shaft 116 pivoted on pins 117 secured to brackets 118 fixed by screws 119 to the machine frame. The crank arms 115 are connected by links 120 with levers 121 pivoted at 122 to brackets 123 secured to the lugs 34. The construction and mounting of the levers 121 and links 120, crank arms 115 and rock shafts 116 are similar to the corresponding features of the first described construction.

Fulcrumed at 124 to the bracket 118 is a lever 125 having a slot 126 engaging the universal bar 113 so that the depression of the universal bar will swing the lever on its fulcrum. The lever 125 may comprise an upright finger 127 at the rear of the fulcrum 124, said finger being useful in connection with the Fig. 10 construction to be later described. The lever 125 further comprises a finger 128 curving up and forward and off-set at 129 to bring its forward end normally to the right of a U-shaped extension 130 on an indicating member 131 fulcrumed at 132 to the top plate and further comprising a shutter 133 and a leftward extension 134. Said extension 134 is pivotally connected at 135 with an arm 136 which extends upward and rightward and terminates in a key or finger button 137 projecting through an opening 138 in the front plate 87. As shown in Fig. 6 the shutter or indicating plate 133, unlike that of the first described construction, lies normally at the left of the opening or peep hole 88. Furthermore the key 137 is normally at the bottom of the slot 138. The normal relationship of the parts is such that if an attempt be made to lift the key 137 to actuate the member 83, movement will be prevented by the side of the U-shaped extension 130 engaging with the finger 128. The shutter or indicator 133 cannot be shifted into the field of the opening 88 until, preliminary thereto, one of the denominational keys has been operated to cut out the ribbon. It will be understood from what has been previously said that the depression of one of the denominational key levers will operate to swing down the universal bar 113, thereby pulling down the links 120, and causing them to operate the levers 121 to disconnect the pinions 32 from the pinions 31. This operation swings the finger 128 rearward out of the path of the extension 130. Consequently the operator holding the denominational key depressed, may then move the key 137 upward to its limit and shift the member 131 rightward, bringing the rear portion of the extension 130 in front of the end of the finger 128, so that when the denominational key is released said finger will contact with said end to hold the parts in abnormal position as shown in Fig. 8, maintaining the pinions 32 separated from the pinions 31. It will also be understood that prior to operating the printing keys for stencil work the printing portion of the ribbon should be hooked under the hook 55 as shown in Fig. 6 and as before explained.

The modification illustrated in Fig. 10 shows the ribbon cut-out operative by a one-key-tabulator mechanism such as is found in some Monarch machines. Said mechanism comprises a push rod 139 terminating at the front in a key 140 and being connected at its rear with the vertical arm of a bell crank 141 having a fixed fulcrum 142. The horizontal arm of said bell crank is connected by a link 143 with one arm of a lever 144, the other arm of said lever supporting an upstanding arm 145, which arm is provided with lifting shoes 146 for releasing the feed rack 22. The upper end of the arm 145 engages with a tabulator stop 147 pivoted at 148 to the machine frame and provided with a spring 149 which holds it in the normal position shown. When the key 140 is pushed in, the arm 145 is moved up, overcoming the spring 149 and moving the rear end or stopping portion 147ª of the pivoted tabulator stop 147 into the field of the column stops 150 which are supported on a stop bar 151 on the carriage. This tabulating mechanism, in so far as the stop construction and releasing devices are concerned, is more fully described in the patent to Barney No. 920,521, granted May 4, 1909.

The same lever 125 may be provided as in the Figs. 6–9 construction and the connected parts including the crank arms 115, links 120 and levers 121 are preferably the same as before, the only difference being that the universal bar 113 may be replaced by a plain cross bar or rod 113ª. In the Fig. 10 construction the cut-out levers 121 are operated from the upright finger 127 which is adapted to be actuated by a finger 152 adjustably secured by a screw 153 to the push rod 139. When the push rod is actuated by the key 140 the finger 152, acting against the finger 127, will swing the lever 125 on its fulcrum, said lever operating through the cross rod 113ª, crank arms 115, links 120 and ribbon cut-out levers 121 to disconnect the pinions 32 from the pinions 31. While holding the tabulator key 140 pushed in, the operator may actuate the finger key 137 as before to swing the member 131 rightward both to lock the ribbon cut-out devices in abnormal position and also to bring the shutter 133 opposite the opening 88. The key 140 may now be released to permit the tabulating mechanism to return to normal position without affecting the ribbon cut-out devices which will remain in abnormal position.

In neither of the modified constructions will the operation of the tabulating mechanism be interfered with by the ribbon cut-out devices.

It will be understood that instead of employing the tabulator key 140 and its connections for operating the ribbon cut-out, a special key and connections to the ribbon cut-out mechanism may be provided.

My invention provides a simple and efficient means for cutting out the ribbon and also for catching and retaining the printing portion thereof out of the paths of the types.

Various changes may be made within the scope of my invention.

What I claim as new and desire to secure by Letters Patent, is:—

1. In a typewriting machine, the combination of a carriage spring drum, a power shaft constantly connected to said spring drum as it turns to advance the carriage in printing direction, said power shaft having rigid bearings, ribbon spools having rigid bearings, connections between said ribbon spools and said power shaft, said power shaft being movable to render said ribbon spools operative in alternation to wind on the ribbon, and key controlled means for breaking said connections independent of movement of the power shaft and of its connections with the spring drum.

2. In a typewriting machine, the combination of two ribbon spools, a source of power, trains of devices for connecting said spools with said source of power, said trains being breakable in alternation at predetermined points for alternately connecting the ribbon spools with the source of power and feeding the ribbon lengthwise back and forth in opposite directions, and means for simultaneously breaking said trains of connections at other and different predetermined points to dispense with the feeding of the ribbon.

3. In a typewriting machine, the combination of two ribbon spools, a source of power, shafts each connected at one end to one of said ribbon spools and at the opposite end to the source of power, means for breaking the connection of the shafts to the source of power, and means for breaking the connection of the shafts to the ribbon spools.

4. In a typewriting machine, the combination of two ribbon spools, a source of power, shafts each connected at one end to one of said ribbon spools and at the opposite end to the source of power, and means for simultaneously moving the opposite ends of the two shafts to disconnect them from the ribbon spools, the connection of the shafts to the source of power being independently disconnectible.

5. In a typewriting machine, the combination of a source of power, a pair of ribbon spools, connections including a slidable shaft between each ribbon spool and the source of power, the slidable shafts having rigid bearings, and means for simultaneously sliding both said shafts to disconnect them from the ribbon spools without affecting their connection to the source of power.

6. In a front-strike typewriting machine, the combination of a platen, two ribbon spools horizontally disposed at opposite sides of the machine forward of the platen, upright spool supporting shafts having rigid bearings, horizontal shafts having rigid bearings, sets of connections between said upright shafts and said horizontal shafts, a spring drum, devices for connecting said spring drum and said horizontal shafts, and means for simultaneously breaking both said sets of connections without affecting the devices for connecting said horizontal shafts and said spring drum.

7. In a front-strike typewriting machine, the combination of ribbon spools, spool supporting shafts, a spring drum, connections comprising a second pair of shafts between said spring drum and said spool supporting shafts, tabulator mechanism comprising a key, and means controlled by said key for breaking the connections between the spool supporting shafts and said second pair of shafts.

8. In a typewriting machine, the combination of ribbon spools, a carriage spring drum, a power shaft constantly connected to said spring drum during printing movements of the carriage, alternately operating connections between said ribbon spools and said power shaft, tabulating mechanism comprising a key, and means independent of said power shaft and controlled by said key for disconnecting both ribbon spools from said power shaft.

9. In a typewriting machine, the combination of a ribbon spool, a source of power, devices adapted to connect said ribbon spool with said source of power, said devices comprising a two-part shaft, one part seated in the other, a spring interposed between the two parts, a connection causing said parts to turn together, and key controlled means for effecting a relative endwise movement between the two parts of said shaft.

10. In a typewriting machine, the combination of a pair of ribbon spools, a source of power, devices adapted to connect said ribbon spools with said source of power, said connections comprising a two-part shaft, each part provided with a pinion, a pin and slot connection between the two parts of said shaft, a spring between the two parts of said shaft, and key controlled means for overcoming said spring and effecting a relative endwise movement of said shaft-parts.

11. In a typewriting machine, the combination of a pair of ribbon spools, a source of power, connections between said ribbon spools and said source of power including a pair of intermeshing pinions having rigid bearings, and key controlled means for breaking said connections, said means comprising two levers each coöperative with one of said pinions, a key, and connections between said levers and said key.

12. In a typewriting machine, the combination of a pair of ribbon spools, a source of power, connections between said ribbon spools and said source of power, and means for breaking said connections, said means comprising a pair of ribbon cut-out levers, a rocking frame connected thereto, and a key for rocking said frame.

13. In a typewriting machine, the combination of a pair of ribbon spools, a source of power, connections between said ribbon spools and said source of power, and means for breaking said connections, said means comprising a pair of ribbon cut-out levers, a rocking frame, a pair of links between said rocking frame and said levers, an additional lever for rocking said frame, and a key operative on said additional lever.

14. In a typewriting machine, the combination of a pair of ribbon spools, a source of power, connections having rigid bearings between said ribbon spools and said source of power, and means for breaking said connections, said means comprising a ribbon cut-out lever, a key controlled rocking frame connected to said lever, and means for positively locking said frame and lever in abnormal position.

15. In a typewriting machine, the combination of a pair of ribbon spools, a source of power, connections having rigid bearings between said ribbon spools and said source of power, and means for breaking said connections, said means comprising a ribbon cut-out lever, a key controlled rocking frame connected to said lever, and means for positively locking said frame and lever in abnormal position, said locking means comprising an indicator.

16. In a typewriting machine, the combination of a pair of ribbon spools, a source of power, sets of connections having rigid bearings, said connections being between said ribbon spools and said source of power, and means for breaking said connections, said means comprising a pair of ribbon cut-out levers, a rocking frame connected thereto, an additional lever operative on said rocking frame, and a key controlled plate operative on said additional lever.

17. In a typewriting machine, the combination of a pair of ribbon spools, a source of power, connections between said ribbon spools and said source of power, and means for breaking said connections, said means comprising a ribbon cut-out lever, a rocking frame connected thereto, a second lever operative on said rocking frame, and a key controlled plate operative to actuate said second lever and also providing a ribbon cut-out indicator.

18. In a typewriting machine, the combination of a pair of ribbon spools, a source of power, sets of connections having rigid bearings, said sets being between said ribbon spools and said source of power, and means for breaking said connections, said means comprising a pair of cut-out levers, a rocking frame, connections between said rocking frame and said pair of levers, and manual actuating devices for said rocking frame.

19. In a typewriting machine, the combination of a pair of ribbon spools, a source of power, sets of connections having rigid bearings, said sets being between said ribbon spools and said source of power, and means for breaking said connections, said means comprising a pair of cut-out levers, a rocking frame, connections between said rocking frame and said pair of levers, a lever for actuating said rocking frame, and key controlled devices for actuating said actuating lever and locking it in abnormal position.

20. In a typewriting machine, the combination of ribbon spools, a source of power, connections between said ribbon spools and said source of power, and means for breaking said connections, said means comprising ribbon cut-out levers, a rocking frame connected thereto, a lever for actuating said rocking frame, and manual devices for actuating said lever and locking it in abnormal position, said devices comprising a shiftable indicator plate.

21. In a typewriting machine, the combination of a pair of ribbon spools, a source of power, connections between said ribbon spools and said source of power, and means for breaking said connections, said means comprising a pair of ribbon cut-out levers, a rocking frame connected thereto, an actuating lever for said rocking frame, and a device operative to cam said actuating lever and lock it, said device being provided with a ribbon cut-out indicator.

22. In a typewriting machine, the combination of ribbon spools, ribbon feeding mechanism, devices movable to an abnormal position to render said mechanism inoperative, a key controlled abutment movable into position to positively maintain said devices in abnormal position, and an indicating plate connected to said abutment.

23. In a typewriting machine, the combination of ribbon spools, ribbon feeding mechanism, ribon feed cut-out devices, an indicator plate shiftable behind a fixed part of the machine, and connections between said indicator plate and said cut-out devices.

24. In a typewriting machine, the combination of a ribbon vibrator comprising parallel guide slots between which the printing portion of the ribbon passes in a straight line, means for actuating the vibrator at printing operation, and a hook rigid on the vibrator intermediate said guide slots and below the same, said hook being normally disconnected from the ribbon but adapted for catching the printing portion of the ribbon and holding it out of operation.

25. In a typewriting machine, the combination of ribbon feed mechanism, ribbon feed cut-out mechanism, a ribbon cut-out indicator, and means normally preventing the movement of said indicator to indicating position.

26. In a typewriting machine, the combination of ribbon feed mechanism, ribbon feed cut-out mechanism, a ribbon cut-out indicator, and means connected to said cut-out mechanism for normally preventing the movement of said indicator to indicating position.

Signed at Syracuse, in the county of Onondaga, and State of New York, this 6th day of May, A. D. 1911.

HERBERT H. STEELE.

Witnesses:
WILLARD C. HAY,
BERNICE E. FOX.